US010037582B2

(12) United States Patent
Carey et al.

(10) Patent No.: US 10,037,582 B2
(45) Date of Patent: Jul. 31, 2018

(54) PERSONAL MERCHANDISE CATALOGUING SYSTEM WITH ITEM TRACKING AND SOCIAL NETWORK FUNCTIONALITY

(71) Applicant: Wal-Mart Stores, Inc., Bentonville, AR (US)

(72) Inventors: Michael Lawrence Carey, Rogers, AR (US); Benjamin McKinley Tucker, Bella Vista, AR (US); Jimmie Thompson Bond, II, Rogers, AR (US); Andrew Weaver, Rogers, AR (US); Chad Helms, Bella Vista, AR (US); Terry J. Osbon, Jr., Fayetteville, AR (US); Mark Holmes, Centerton, AR (US)

(73) Assignee: WALMART APOLLO, LLC, Bendonville, AR (US)

( * ) Notice: Subject to any disclaimer, the term of this patent is extended or adjusted under 35 U.S.C. 154(b) by 808 days.

(21) Appl. No.: 13/962,081

(22) Filed: Aug. 8, 2013

(65) Prior Publication Data
US 2015/0046289 A1 Feb. 12, 2015

(51) Int. Cl.
*G06Q 30/00* (2012.01)
*G06Q 50/00* (2012.01)
*G06Q 30/06* (2012.01)

(52) U.S. Cl.
CPC ......... *G06Q 50/01* (2013.01); *G06Q 30/0625* (2013.01)

(58) Field of Classification Search
CPC ............... G06Q 30/00; G06Q 30/0601; G06Q 30/0621; G06Q 30/0631; G06Q 30/0641
See application file for complete search history.

(56) References Cited

U.S. PATENT DOCUMENTS 8,386,329 B1 2/2013 Baughman et al.
2004/0030697 A1* 2/2004 Cochran .......... G06F 17/30861
(Continued)

OTHER PUBLICATIONS

Golbeck, Jennifer, and James Hendler. "Filmtrust: Movie recommendations using trust in web-based social networks." Proceedings of the IEEE Consumer communications and networking conference. vol. 96. No. 1. 2006. (Year: 2006).*
(Continued)

*Primary Examiner* — Michael Misiaszek
*Assistant Examiner* — Christopher B Seibert
(74) *Attorney, Agent, or Firm* — Schmeiser, Olsen & Watts LLP

(57) ABSTRACT

An online personal merchandise cataloguing system is equipped with integrated item tracking and hosted (or imported) social network functionality. The system comprises an internet application with a supporting backend network, the pertinent configuration and operation of both being substantially under the control of an individual retailer. Accessible through an internet browser or a smartphone "app", the internet application is configured to provide a user with means for listing or otherwise cataloguing items of merchandise. In combination with and supported by the retailer's backend computer network, the internet application enables the user to share his online catalog with an extrinsic social network and to track cataloged items.

11 Claims, 5 Drawing Sheets

(56) References Cited

U.S. PATENT DOCUMENTS

| | | | |
|---|---|---|---|
| 2004/0122690 A1* | 6/2004 | Willoughby | G06Q 10/08 |
| | | | 705/337 |
| 2007/0106570 A1* | 5/2007 | Hartman | G06Q 10/087 |
| | | | 705/26.2 |
| 2007/0168216 A1 | 7/2007 | Lemelson | |
| 2009/0164323 A1* | 6/2009 | Byrne | G06Q 30/02 |
| | | | 705/14.56 |
| 2011/0112901 A1 | 5/2011 | Fried et al. | |
| 2011/0184780 A1 | 7/2011 | Alderson et al. | |
| 2012/0059848 A1* | 3/2012 | Krishnamoorthy | G06Q 30/02 |
| | | | 707/770 |
| 2012/0123837 A1* | 5/2012 | Wiesner | G06Q 30/0214 |
| | | | 705/14.16 |
| 2012/0158539 A1 | 6/2012 | Lawrence et al. | |
| 2012/0265635 A1 | 10/2012 | Forsblom | |
| 2013/0006788 A1 | 1/2013 | Zhou et al. | |
| 2013/0006816 A1* | 1/2013 | Nuzzi | G06Q 30/0261 |
| | | | 705/27.1 |
| 2013/0090998 A1 | 4/2013 | Shimogori | |
| 2013/0103494 A1 | 4/2013 | Leventhal | |
| 2013/0159081 A1 | 6/2013 | Shastry et al. | |
| 2013/0166725 A1* | 6/2013 | Liyanage | G06Q 10/10 |
| | | | 709/224 |

OTHER PUBLICATIONS

Kim, Young, and Jaideep Srivastava. "Impact of social influence in e-commerce decision making." Proceedings of the ninth international conference on Electronic commerce. ACM, 2007. (Year: 2007).*

International Preliminary Report on Patentability in related International Patent Application No. PCT/14/48768, dated Feb. 18, 2016; 6 pages.

International Search Report and Written Opinion, received in PCT/US14/48768 (dated Nov. 24, 2014).

Kit Eaton, "GDGT Web Site Launches, Brings Social Networking to Gadgets" (Jul. 2, 2009), published on «www.fastcodesign.com».

Dwight Silverman, "New gdgt social network is a virtual Geek Gathering" (Jul. 2, 2009), published on «blog.chron.com/techblog».

"Help and FAQ—gdgt", accessed and printed from «gdgt.com/help» on Jun. 3, 2013.

* cited by examiner

PERSONAL MERCHANDISE CATALOGUING SYSTEM WITH ITEM TRACKING AND SOCIAL NETWORK FUNCTIONALITY

FIELD

In general, the invention is directed to consumer product information platforms, and particularly, to an online personal merchandise cataloguing system with item tracking and social network functionality.

BACKGROUND

The use by consumers of various internet resources and services for researching products prior to purchase is now commonplace.

In the distant past, product research often involved time and effort consuming methodologies, often resulting in generic or peripheral product literature, often prepared by biased commercial and organizational entities. Today, large libraries of product information obtained from several sources are easily accessible online. For example, as is well known, virtually all ecommerce websites currently operated by major commercial retailers enable costumers to search for specific products, obtain product specifications, and browse through (as well as contribute to) product appraisals, ratings, and reviews.

Retailers understand that providing customers with detailed information about the products they carry tends to promote retail activity. Fueled also by increased competition, retailers are now quite keen to continue the development, incorporation, support, and use of innovative product information services in their customer-facing retail platforms.

In considering and evaluating common practices found in current ecommerce websites, it is proposed that, with respect to product ratings and reviews, customers are likely to place a higher value on the ratings and reviews of individuals that are personally known, rather than those of strangers. However, in all the ecommerce websites considered, the ratings and reviews are invariably non-personal, being largely sourced from a broad population of unconnected users.

Furthermore, while detailed product information is easily available from ecommerce websites—as is the case with ratings and reviews—the product information tends again to be non-personal, being formatted statically for broadcast to a wide audience. There is little, if any ability, to tailor and personalize the product information retrieved from the ecommerce site.

In light of the above, there is clearly a considerable need for delivering personalized, timely, and pertinent product information to retail customers. Provided the personalized information is delivered in a manner that engages broad customer interest and use, the development and control of such online resource by an individual retailer can provide substantial service differentiation, as well as promote goodwill, customer loyalty, and retail sales activity.

SUMMARY

In response to of the above need, an online personal merchandise cataloguing and information solicitation system is presented having integrated item tracking and hosted (or imported) social network functionality.

The system, in particular, comprises an internet application and a supporting backend network, the pertinent configuration and operation of both being substantially under the control of an individual retailer. Accessible through an internet browser or a smartphone "app", the internet application is configured to provide a user (e.g., an ongoing or prospective customer of the retailer) with means for listing or otherwise cataloguing certain items of merchandise (i.e., items available from the retailer).

In combination with and supported by the retailer's backend computer network, the internet application enables the user to share his online catalog with an extrinsic social network (i.e., operated by a third-party social network service provider) and to track items within that catalog. In sharing and tracking his catalogued items, information about those items is obtained or otherwise solicited by the user from the user's social network and from the retailer's backend computer network, respectively.

In light of the above, it is a principal objective of the invention to provide an online personal merchandise cataloguing system with item tracking and social network functionality.

It is another objective of the invention to provide an online personal merchandise cataloguing system comprising an internet application and a supporting back end network, both having a configuration that is substantially under the control of an individual retailer.

It is another object of the invention to provide online means for a user to catalog items of merchandise and solicit information about those items from individuals known to the user.

It is another object of the invention to provide online means for a user to catalog items of merchandise available from a retailer and to receive specifiable information about those items from the retailer.

It is another object of the present invention to provide an online personal merchandise cataloguing system with item tracking and social network functionality, and utilizing a smartphone application capable of identifying items of merchandise through bar code scanning.

For a further understanding of the nature and objects of the invention, reference should be had to the following description taken in conjunction with the accompanying drawings.

DETAILED DESCRIPTION

Through the invention, a retailer provides a unified source for its customers to solicit information about merchandise from both the retailer and from a predefined electronic social network of friends. Unlike other internet product rating services, the invention is distinguished in its use of trusted reviews (i.e., from the customer's social network), which when combined with substantial retailer database access, provides personalized, if not substantially better and more credible, information about the retailer's merchandise.

Figure 1:
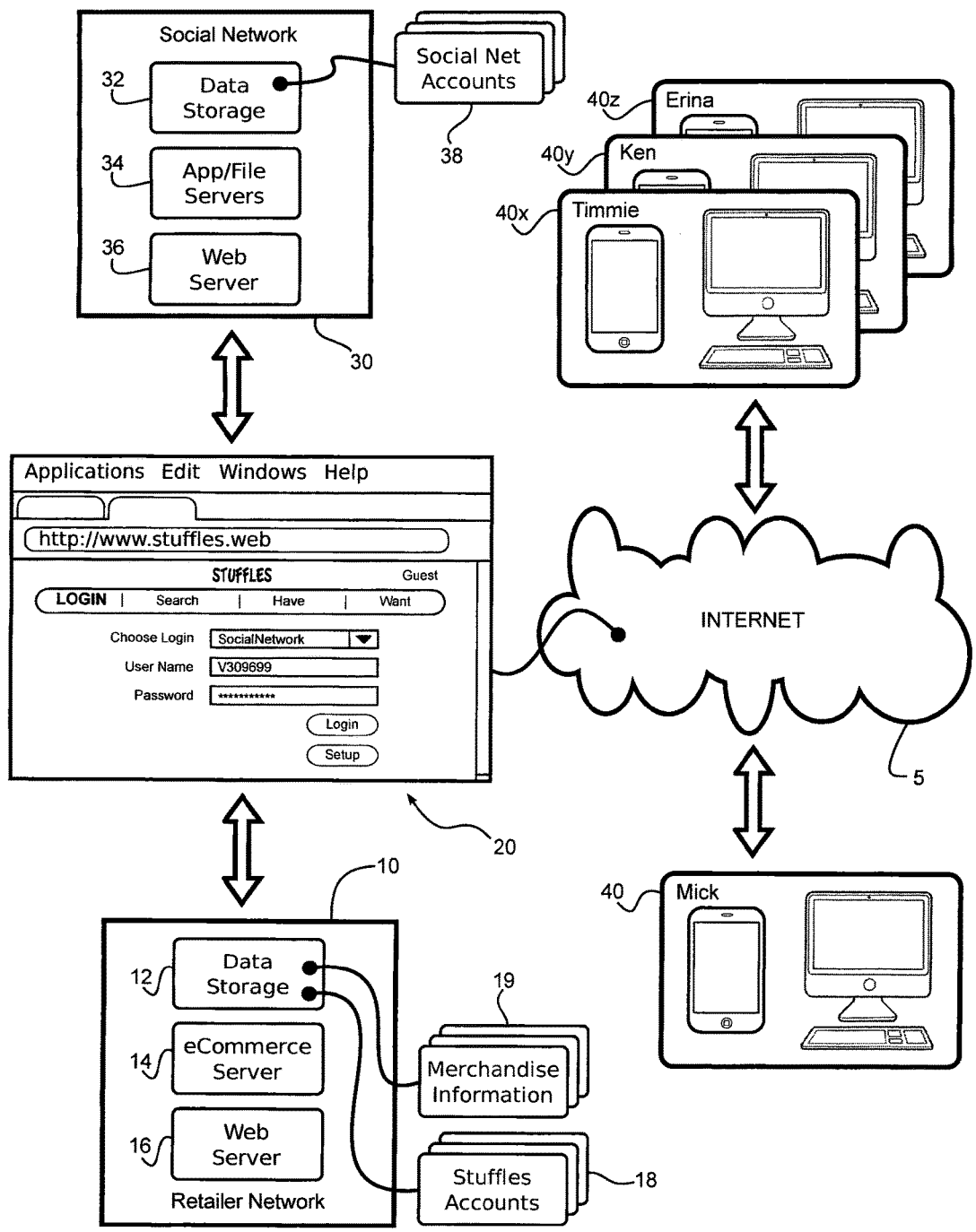
FIG. 1 illustrates schematically a personal merchandise catalog system according to an embodiment of the invention.

As shown in FIG. 1, the system comprises a retailer backend network 10 having a secure product database facility 12 containing records 19 of the retailer's merchandise, and an internet application 20 with authorized data access into the secure product database facility 12. Internet application 20 provides an interface for enabling identification by the user 40 of the retailer's merchandise through the authorized data access.

As a key feature, the retailer internet application 20 is hosted wholly or in part on or from a social network service provider 30—and as such—is capable of associating the user 40 to his account 38 on a social network website that links him to his "friends" 40x, 40y, and 40z. The identification of merchandise can thus be performed through a programmed routine that publishes it through the social network website in association with the user account 38, thereby soliciting information about the merchandise from those "friends" 40x, 40y, and 40z.

In combination with the social network functionality, the internet application 20 is also provided with means for "tracking" identified items of the retailer's merchandise. This functionality—fostered through the authorized data access—enables the user 40 to personalize the product information reports he receives or otherwise solicits from the retailer backend network 10.

In respect of its technical details and configuration, the "retailer-operated computer network" 10 can be engineered in accordance with well-known network architectures and topologies and—in addition to it unique components—can comprise a plurality of interconnected computers and terminals, servers, hubs, routers, switches, network security devices, network management devices, wireless nodes and access points, load balancers, and related software.

The retailer's backend network need not be designed specifically and exclusively for the implementation of the inventive system. The backend network can be provided through appropriate modification of a pre-existing network and can have far broader purposes and functions, such as providing overall corporate, administrative, financial, IT, and retail related services.

The physical topology of the retailer's backend network 10 can be quite broad and extensive, with its components widely distributed over different locations, if not different geographies. With an eye towards unification, however, the logical topology of its core functions is nonetheless preferably "centralized" to promote good data flow, signal strength, ease of management, and accessibility.

For the specific services and functions of the invention, the key assets of the retailer's backend network 10 are the secure product database 19 in data storage facility 12 and a web server 16.

The data storage facility 12 can comprise one or more data storage devices capable of recording and retrieving digital information from a medium (e.g., magnetic, optical, semiconductor, etc.). For small to medium-scale retailers, the data storage facilities can utilize storage with comparatively modest capacity, such as provided by a single internal or external hard drive or flash drive. For large global retailers, the data storage facilities will require greater capacity and bandwidth, and thus, may employ several networked and attached electronic data storage components, these being deployed at an enterprise-scale and may include, for example, arrays of data servers and file servers; SAN and NAS storage facilities; RAID storage systems; data backup, archiving, and redundancy facilities; and data management and load balancing agents.

The secure product database 12 contains records 19 of each item of merchandise handled by the retailer.

"Security" of the product database 12, as that term is used herein, means that no third party should be able to access any of the records of the product database without authorization from the retailer. For third parties, authorization can for example be executed through standard authentication methodologies and/or policies enforced by an API.

Examples of data included in the secure product database in connection with each item of merchandise include, but is not limited to, product identification information (e.g., name, brand, supplier, serial number, SKU, description, image, perishability data, shelf-life data, handling data, weight, dimensions, related and alternative products, etc.), price information (e.g., price, sale price, applicable discounts, price history, etc.), and availability information (e.g., availability status, store locations, aisle locations, warehouse locations, quantities, shipping and delivery data, etc.)

As discussed further below, the data storage facility 12 can also include a subscriber account database specifically used to support the retailer internet application. This account database 18 can include such data as the user's name, account number, authentication information, transaction and/or access history, ecommerce information, and social network information.

The web server 16 is used to publish (i.e., make publicly accessible) the retailer internet application 20 to the internet 5. The web server 16 comprises the hardware and software components used to serve HTML pages (and the like) to a suitable web browser, and includes applications (or is otherwise in communication with an application server) for executing high level language routines and connecting to the network databases in support of the HTML pages.

In preferred embodiments of the invention, the retailer backend network 10 will also include a dedicated ecommerce server 14, which is used to provide ecommerce functionality. Preferred dedicated e-commerce servers include blade-based and/or rack mountable server appliances configured with industry standard e-commerce software and tools, including Web services such as IIS, Apache, iPlanet, Tomcat and application services including Weblogic and Websphere, as well as database services such as Oracle and Microsoft SQL, for conducting secure e-commerce transactions using secure socket layer (SSL). Vendors who currently supply such dedicated ecommerce servers include Hewlett-Packard, Inc. (Palo Alto, Calif.), Dell Inc. (Round Rock, Tex.), International Business Machines, Inc. (Armonk, N.Y.), and Sun Microsystems (i.e., Oracle Corporation, Redwood City, Calif.).

Given that the proprietary merchandise records and databases are contained in the retailer secure database facility, one of the features of the internet application—which executes beyond network firewall—is the engineered capability thereof to access these records. The various modalities for engineering such authorized data access is within the skill in the art.

Access can be provided, for example, by scripting the desired service calls and data transfers available through an API associated with a retailer's ecommerce facility. Deeper access can be provided by programming more direct communication channels, gateways, interfaces, and the like between the internet application 20 and any pertinent product databases in the retailer's data storage facility 12. Since the configuration of the internet application 20, product database 19, and data storage facility 12 are within the retailer's control, substantial latitude is available for defining and obtaining permissions, setting and enforcing policies, and other like programmable variables effecting data access and authorization.

With the authorized access, the internet application 20 is configured to enable a user to identify particular items of merchandise by processes that search through and retrieve records from the accessible product databases 19 in the retailer data storage facilities 12.

A suitable user interface comprising drop down menus, interactive lists and tables, and/or a search field is provided in the internet application 20, enabling a user to query information (e.g., brand name, a serial number, a product description, etc.) from the database 19 and to select an item from any results or "hits" returned in response thereto. This selection essentially "identifies" the item. Subsequently, the identified item can be catalogued by the user, for example, into a "wish list file", "want list file", or other "merchandise list file", and shared with (i.e., communicated to) the user's social network.

In certain embodiments of the invention, the internet application will have means for searching for items of merchandise available from third parties, for example, by submitting a user search input into an online third party (or otherwise extrinsic) product search facility. For such embodiments, search and result priorities can be weighted in favor of the retailer's merchandise.

With broad intrinsic and extrinsic search capabilities, the internet application can also incorporate means advantageously to collect, aggregate and report user search and selection activity back to the retailer network 10 (in a manner respecting user privacy) for competitive market analysis and review.

As suggested above, the "sharing" of identified items of merchandise in a user's online catalog is effected by the internet application's social network functionality. In this regard, as stated above, the internet application 20 is hosted wholly or in part on or from a third-party social network service provider.

As shown in FIG. 1, a social network service provider typically provides its service through a network 30 that comprises inter alia a web server 30 (e.g., used for publishing their social network website and supporting related "plugins" and hosted sites), application and file servers 34 (e.g., used for driving their social network applications and programs), and data storage 32 (e.g., used for supporting their website and for recording user accounts 38).

As used herein, a "social network website" shall include any third-party operated web site (or related web service) wherein each user is provided with tools to construct a personal profile and/or personal data stream and selectively link that profile and/or data stream to other users of the social network, thereby defining an online community or group of users.

Each social network user is assigned at enrollment to a social network user account (cf., accounts 38 in FIG. 1), which is used to hold data related to both the user's profile and his linked community of users (cf., "friends", "connections", "followers", "following", etc.). Linkages can be "selective" either in respect of other users (e.g., a user's profile is viewable only by "friends") and/or content (e.g., certain information within a profile is available only to a user's "connections"). Selective linkage can also be effected actively (e.g., requesting or accepting an invitation to connect) or passively (e.g., other users electing or not to "follow" a particular user).

Current examples of social network websites and providers include, but are not limited to, "Facebook" (operated by Facebook, Inc., Menlo Park, Calif.), "Twitter" (operated by Twitter, Inc., San Francisco, Calif.), "Google+" (provided by Google, Inc., Mountain View, Calif.), "Linkedin" (operated by LinkedIn Corporation, Mountain View, Calif.), "Friendster" (operated by Friendster, Inc., Kuala Lampur, Malaysia), "hi5" (operated by Tagged, Inc., San Francisco, Calif.), "Bebo" (operated by Bebo, Inc., San Francisco, Calif.), "MySpace" (operated by MySpace LLC, Beverly Hills, Calif.), "Classmates" (operated by United Online, Woodland Hills, Calif.), and Qzone (operated by Tencent Holdings Ltd., Shenzhen, China).

The selection of the "social network website" used for hosting the retailer internet application can be influenced by the retailer's business needs, for example, by taking into consideration user demographics, web traffic patterns, and the total number of registered users of the social network website. In certain embodiments, the internet application can be engineered to be hosted using the various services and tools of a number of social network websites.

The form of "hosting" by the third-party operated web site is variable. For example, the retailer's internet application can comprise an independently published website that incorporates "plug ins" that enable social network functionality therein (e.g., the use of the electronic relationships created among users of the social network). Likewise, in more closely commingled examples, the retailer's internet application can be more deeply embedded into, "framed" within, or otherwise integrated into the third-party social network fabric, such as by creating a "web app" that executes directly within or through the core of the extrinsic social network application.

As will be appreciated, much of the variability and specific technical implementation of "hosting" will largely rely upon the structure and operation of the third-party social network platform. Regardless, in all embodiments of the present invention, the "hosting" will at the least involve access and use of the electronic relationships of the social network user within that platform.

It will also be appreciated that the terms "hosting" and "hosted" refer to the "social network functions" of the internet application 20. The retailer's internet application can have other functions that are not "hosted" or otherwise reliant upon the third-party social network (e.g., ecommerce functionality). In contrast, social network functionality within the retailer's internet application will in all instances rely upon the existence of at least one third-party social network host.

As shown in FIG. 1, the internet application 20 (i.e., a website hypothetically entitled "Stuffles") is published onto the internet 5 through a web server 16 in the retailer's backend network 10. The internet application is configured to identify a user either by a retailer-assigned account 18 and/or by a user account 38 assigned at the social network. Where several accounts are involved, such as in an online personal catalog website that engages a plurality of social networks, appropriate and well known account management services can be included in the internet application and/or its supporting backend network resources.

Regardless of authentication methodology, once a user 40 is "logged in", the application associates that user 40 to the user account 38 in the social network service 30 that contains his "links" (cf., connections, relationships, associations, etc.) to his "user-defined group of other users" (cf., his "friends", "connections", "followers", "followed", "circles", etc.). In general, the objective here is to access or otherwise make available the user's extrinsic electronic social network from within the online personal merchandise product catalog 20.

In certain embodiments, the internet application 20 can also incorporate tools and services for adding, modifying, or deleting links either to the "user-defined group of other users", or for creating and managing a separate user group intrinsic to the retailer's internet application. For the latter, data representative of said separate user group can be recorded, stored, and/or associated with the user's retailer-assigned account 18 within the retailer backend network 10.

Provided access to both the retailer's product databases 19 and the user's social network, the internet application can incorporate programmed routines that allow the user 40 to identify and catalog owned or wanted items of merchandise in a manner that exposes these items to his social network 40*x*, 40*y* and 40*z*, and thereby solicits from that social network any information, opinions, comments, ratings, or reviews they wish to share about those items.

The programmed routines, and thus, the manner in which identified items of merchandise are published to the user's social network, can rely substantially upon the callable services provided by the social network service provider, e.g., rating services, news feeds, so-called "wall postings", and the like. Such service are often embodied as "plug ins" obtainable from the social network service provider 30 or supported or otherwise hosted from the provider's application/file servers 34. Publication can also be enabled within the internet application, without using the social network provider's publishing services, using for example the user's social network information (cf., a user account name or user email address) as a destination or target for the broadcast of the user's catalog.

In respect of the solicitation of information from the user's social network, such internet application service can be performed either actively or passively. For the former, the internet application 20 can include interface means that require a user to actively authorize the "sharing" of his lists or items and/or for requesting ratings, opinions, and the like. For the latter, once items are identified and catalogued by a user, they are automatically published to his social network, which is then free to comment as users therein see fit.

For embodiments of the invention, wherein programmed routines are largely provided by the social network service provider 30, the manner in which information is published and solicited from the social network will already be largely defined. This can be advantageous for the retailer to the extent that the retailer's internet application 20 need not incorporate such functions, reducing program size and complexity, whilst leveraging the assets, resources, and expertise of the social network service provider. For users, familiarity with the interfaces found on popular social network websites can promote faster acceptance, adoption, and use of the invention.

To provide further convenience to the user 40, preferred embodiments of the internet application 20 will also incorporate an ecommerce portal, enabling the user to purchase items of interest online. The ecommerce portal can either be a simple link to the retailer's primary online ecommerce website (e.g., a hyperlink to the relevant html address) or can incorporate the assets and programming needed to transact an online purchase within the internet application itself without redirection (e.g., through the use of forms that request and collect purchase-related information from the user, which is then sent to the ecommerce server for processing, fulfillment, and acknowledgment).

In preferred embodiments, the internet application is further configured such that the identification by the user 40 of particular items of merchandise involves the categorization of those items into a merchandise list file.

Where the intended audience for the internet application are retail consumers and customers, the preferred categorization types are "wish lists" and "owned lists". Other useful list types that personal and business users may wish to "share" with their personal and/or professional social network include, but are not limited to, lists based on subject matter (e.g., sports related items, household related items, office related items, hobby related items, and entertainment related items), lists based on user intent and like subjective criteria (e.g., favorite items, watched and tracked items, shopping lists, recommended items, and project related items), and lists based on extrinsic criteria (e.g., geographic availability, business and professional classifications, legal and regulatory classifications).

As mentioned above, the internet application 20 is configured with authorized access to the retailer's secure product database facility 12. This access is used principally for identification of merchandise. However, in preferred embodiments, the access is exploited by the internet application 20 to provide a product tracking and notice feature.

In particular, the internet application 20 is configured such that, aside from soliciting information from a user's social network, items of merchandise identified by a user can also be elected to be tracked, such that information about the tracked item is retrieved from the secure database facility and reported in accordance with certain user-defined notice parameters (e.g., frequency, event-based triggers, format, and/or timeframe).

The information reported back to the user is either pulled directly from the records contained in the secure product database facility 12 (e.g., basic price and location information) and/or extrapolated from those records through scripted computational processes (e.g., information on related or alternative items, price patterns and trends, etc.). With regard to the latter, such information can be provided as a direct response to user-set criteria (e.g., reporting back a "list of alternative items" in response to a user request for a "list of alternative items") or volunteered automatically or otherwise indirectly as a result of information derived therefrom (e.g., reporting back a "list of alternative items" in response to user request for "price tracking" of an item that later becomes discontinued).

The preferred types of information for tracking include (a) information about availability, (b) information about prices, and (c) information about related and alternative items. Other types will be known to those skilled in the art.

Information about availability can include, but is not limited to, an item's location in a store (e.g., backroom location, shelf location, and aisle location), particular stores that carry an item, geographical availability, seasonal availability, minimum quantities, an item's status (e.g., "discontinued", "on back order", "release date", "pending", "delayed", "sold", "purchased", "in transit", "temporarily out of stock", etc.), and an item's distribution channels and mechanisms (e.g., "online", "in store", "available for pick up", "free shipping", "expedited delivery", etc.)

Information about price can include, but is not limited to, retail price, sale price, discounts (e.g., inclusion in a price rollback program), MSRP, minimum bids, price trend (e.g., for volatile commodities), price history, price comparisons, competitor prices, and detailed price breakdowns (e.g., for automobiles and/other high value items).

Information about related items can include, but is not limited to, product accessories; items purchased in combination with other items (e.g., ink and printers, batteries and toys, cables and electronics, etc.); functional equivalents, substitutes and replacements (e.g., for discontinued items); alternative brands and labels (e.g., store brands and generics); and supply/source options (e.g., "organic", "fair trade", "certified", "domestic", and the like).

To further explain the invention, reference is now made to the representative example of an internet application 20 illustrated schematically in FIGS. 2A to 5.

Figure 2A:
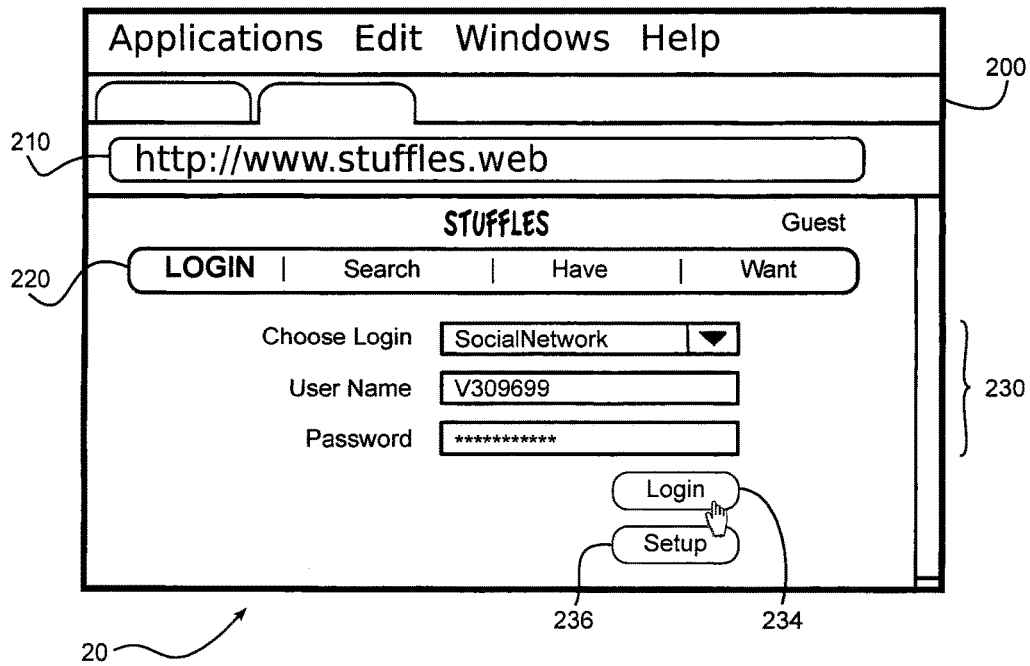
FIGS. 2A to 5 illustrate certain features and functions of an internet application 20 used for the personal merchandise catalog system of FIG. 1, pursuant to a representative implementation of the invention.

As shown in FIG. 2A, the internet application is embodied as a website 20—hypothetically entitled herein as "Stuffles"—that is accessible using a web browser 200 pointed toward the site's URLs 210 (i.e., "www.stuffles.web").

The "home" or "landing" page for the website is preferably a "login" page that includes a login interface for returning registered users, as well as means for registering new users. As to the former, the login interface can comprise text fields for entering both a user name and a password, and login button for transmitting the entered login information to an appropriate authentication agent provided, for example, within the retailer's backend network 10. As for registering new users, a hyperlink activatable button 236 is used to lead a new user to areas of the website that provide forms, authorizations, and information related to setting up a new account.

Figure 2B:
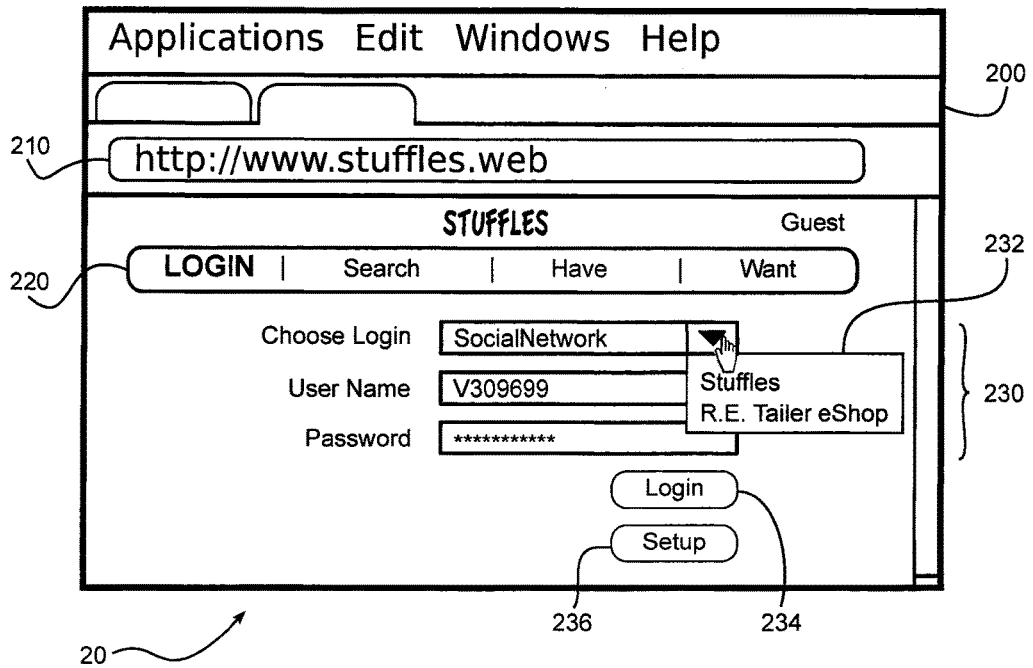

As shown in FIG. 2, the configuration of website 20 acknowledges that a user may have existing accounts with the retailer and/or an extrinsic social network service provider. To further accommodate management of such multiple user accounts, a drop down menu is provided so that a user can select the account he wishes to use for purposes of authentication. Thus, as shown, the user can either login through his social network account (cf., "SocialNetwork", his account for the inventive cataloguing system (cf., "Stuffles"), or his ecommerce account (cf., "R.E. Tailer eShop").

Once authenticated and logged in, the user (cf., "Mick") is provided access to several site services as identified in navigation bar 220 (i.e., "Search", "Have", and "Want").

Figure 3A:
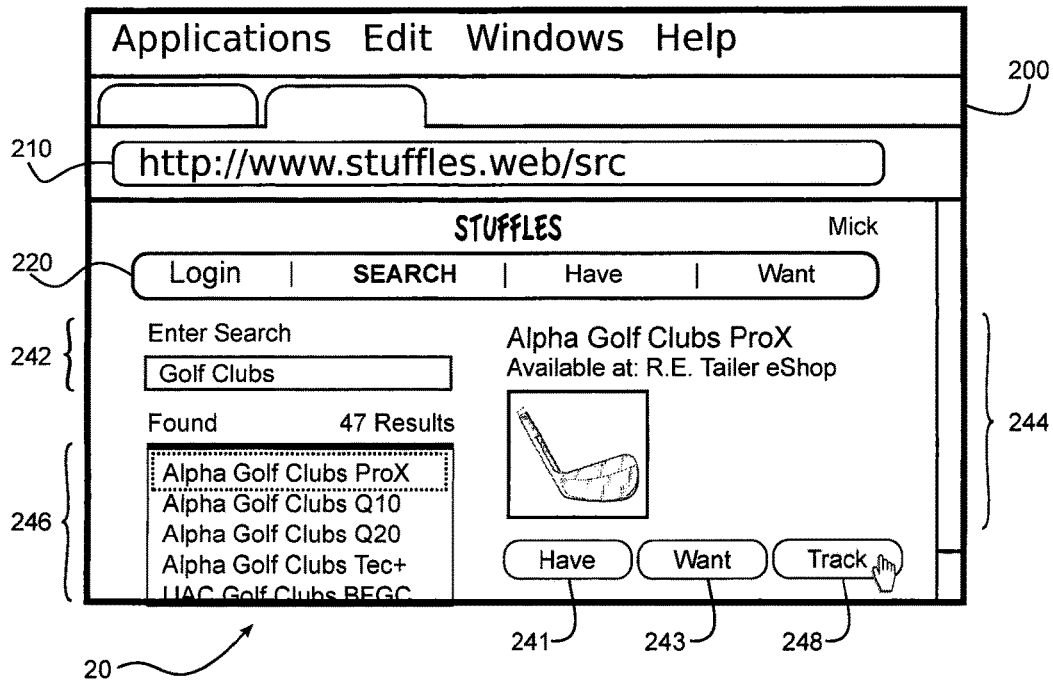

In general, the "Search" service is used for searching and tracking items of merchandise. As shown in FIG. 3A, the "Search" service include text input field 242, a results list output field 246, and detailed item information field 244. In operation, the user searches for product by inputting a search query (e.g., "golf clubs") into text input field 242, which is transmitted to the retailer's backend network 10 for text parsing, analysis and item matching. The results thereof are then returned to the website and displayed in output field 246. The output field 246 is programmed such that, if the user spots an item of interest among the returned hits (cf., "Alpha Golf Clubs ProX"), he can select it and have more detailed product information and service options displayed in field 244.

Once an item had been selected, the user in FIG. 3A is provided with the option of having the item catalogued into his have list (i.e., by clicking the "Have" button 241) or into his want list (i.e., by clicking the "Want" button 243). The user can also chose to have the item tracked (i.e., by clicking "Track" button 248).

Figure 3B:
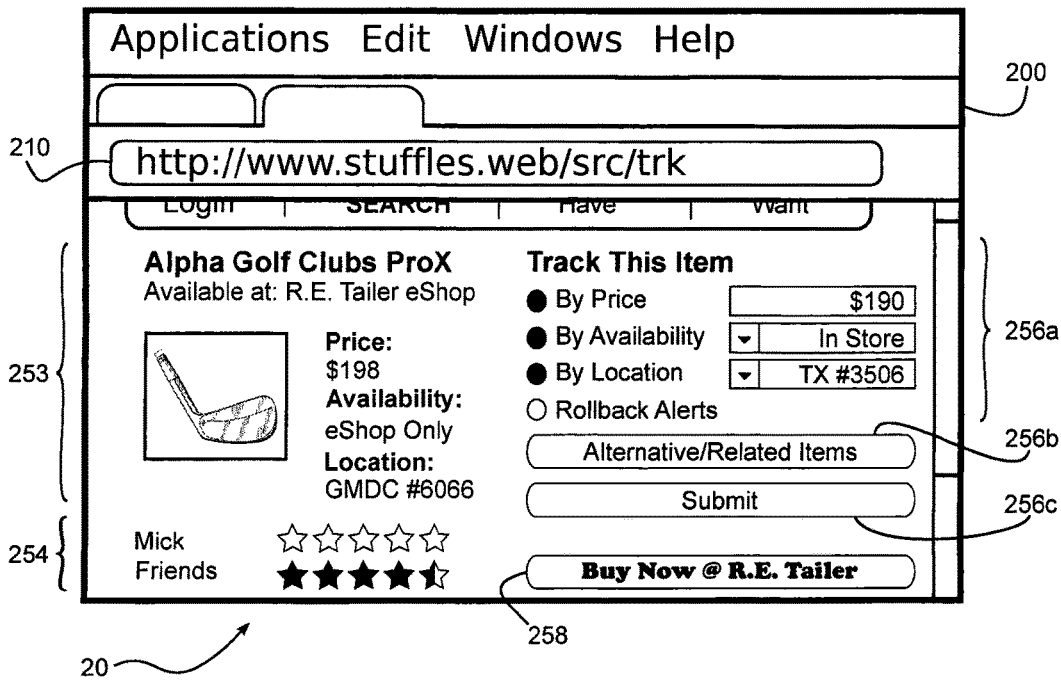

As to "tracking", button 248 is hyperlinked to the webpage illustrated in FIG. 3B. A shown therein, the item tracking page provides additional detailed information 253 about the identified item (i.e., "Availability", "Location", and "Price"), product ratings 25 provided by the user (i.e., "Mick") and/or his social network (i.e., "Friends"), and an interface 256a, 256b, and 256c for tracking the item. In particular, interface 256a allows the user to specify a number of criteria (i.e., "Price", "Location", "Availability" and "Rollback Alerts"), as well as define any appropriate specific triggering events (e.g., a specific price sought or location), for which the user wishes to receive alerts or notices. Once the criteria and triggers are set, tracking is activated by clicking the "Submit" button 256c.

As suggested above, alternative or related items can be reported back to a user as the result of a tracked product criteria or event. As shown in FIG. 3b, these item can also be provided on an "on demand" basis (cf., button 256b). If the user is already acceptable of the terms of the product as sold, means are provided on the website 20 to immediately electronically purchase the product (i.e., button 258) through the retailer's ecommerce facility 14.

Figure 4A:
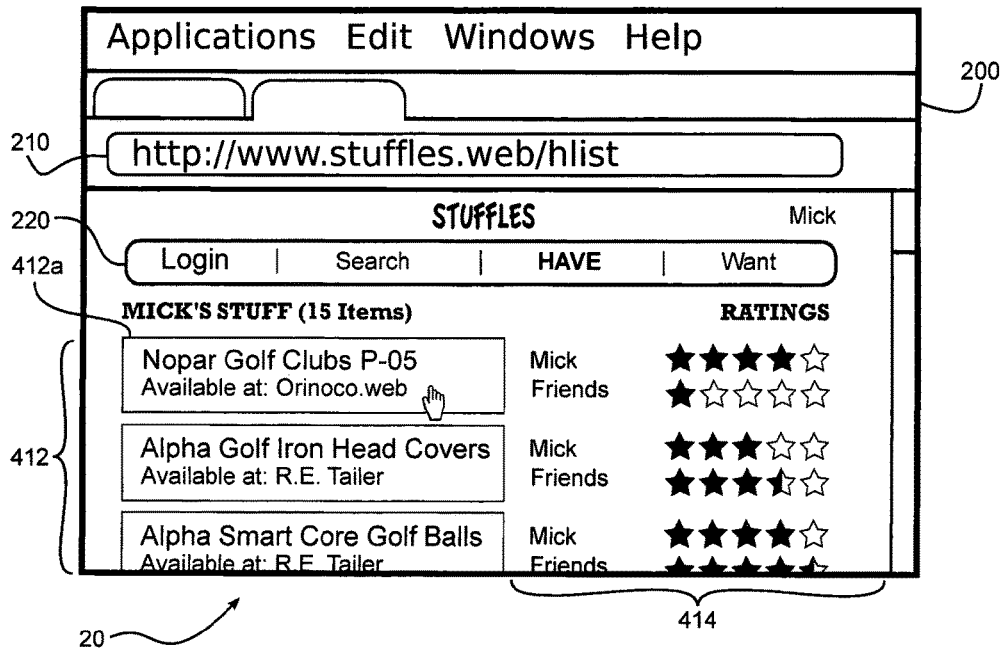
Figure 5:
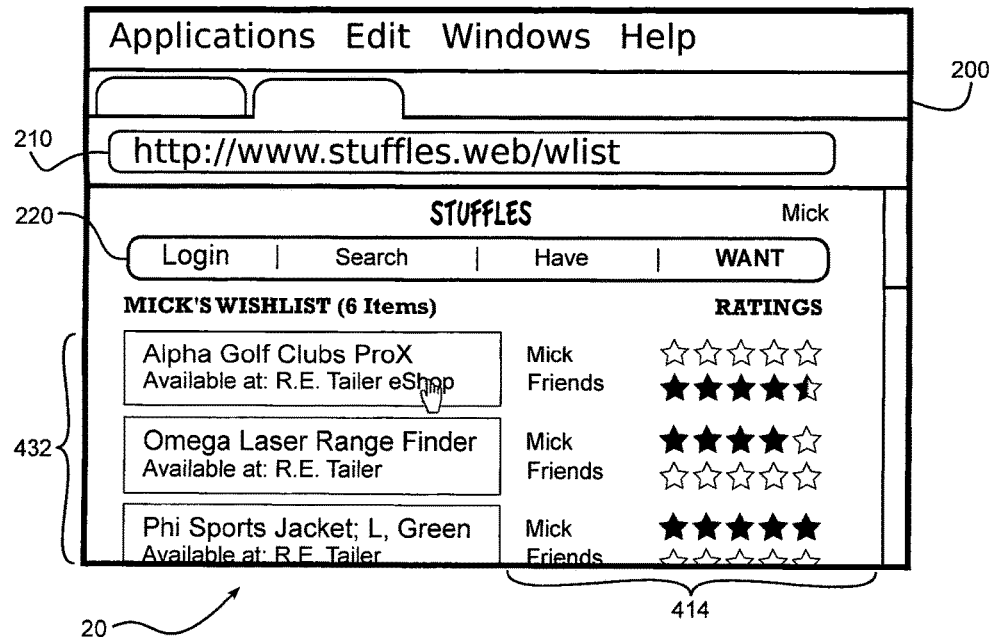

In general, the "Have" and "Want" services of the website 20 is used for cataloguing items of merchandise that the user either has or wants, and include any ratings, comments, and reviews of these items submitted either by the user 40 or a member of the user's social network (40x, 40y, and 40z). As shown in FIG. 4A, items that user 40 had catalogued into his "Have" list are identified in listing 412, and adjacent thereto, any corresponding ratings volunteered by the user and/or his social network. Similarly, as shown in FIG. 5, items that the user 40 had catalogued into his "Want" list is identified in listing 432, with the ratings 414 also adjacent thereto.

As shown in FIG. 4a, items appearing in listing 412 can be clicked to reveal additional details about the product and its ratings. For example, by clicking item 412a (i.e., "Nopar Golf Clubs P-05"), as shown in FIG. 4b, website 20 provides a fuller item description 412a' (i.e., including an image of the item), a reiteration of the ratings 414 from FIG. 4a, and a detailed presentation 416 of all the specific ratings, reviews, comments, and the like volunteered within the user's social network, identified by individual users and dates.

Figure 4B:
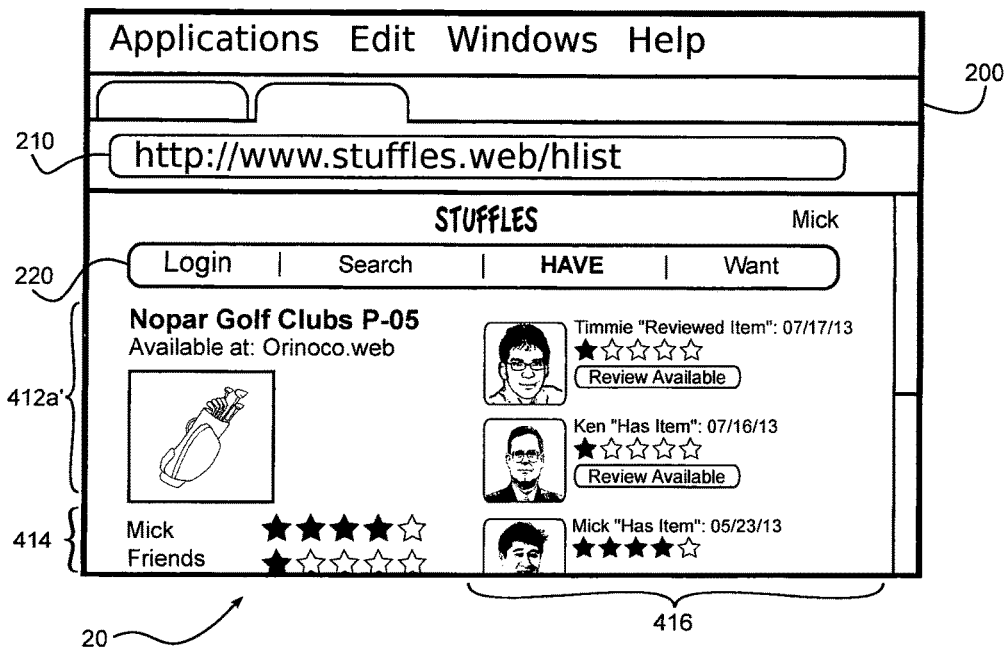

As shown in FIG. 4B, if an individual user "has", "does not have", "wants", or "does not want" an item, such information can be indicated within the detailed ratings structure of presentation 416. Similar presentations and functionality would also be available for "wanted items" listed in listing 432 of FIG. 5.

In respect of "mobility", the internet application 20 of the present invention—aside from being designed as an internet website—can also be distributed to customers or otherwise provided as a downloadable smartphone application (i.e., a so-called "app"). In general, while the platform is different, the basic functionality incorporated into a corresponding internet website (cf., searching, cataloguing, sharing, and tracking) is substantially replicated in the mobile version thereof, accommodating and respecting the different technical capabilities and assets of the platform. Appropriate supporting functionality—well known in the art—is also added to the retailer's backend network 10.

Figure 6:
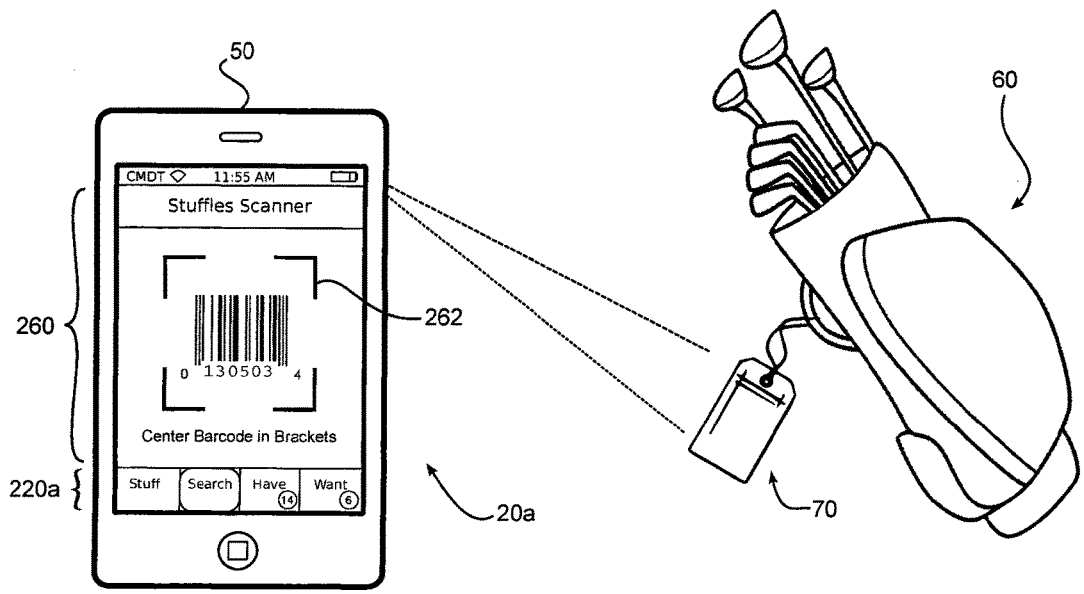
FIG. 6 illustrates schematically a bar code scanning function of a smartphone application 20a, pursuant to another representative implementation of the invention.

Aside from mobility, a key advantage of having a smartphone-based internet application is that most currently-available smartphones are equipped with an integrated digital camera that can be used for scanning product bar codes. As shown in FIG. 6, bar code scanning can facilitate substantially the identification of merchandise.

FIG. 6 in particular depicts a mobile app executing on a personal smartphone 40, the mobile app having a navigation menu 220a analogous to navigation bar 220 of internet website 20 and leading to an analogous selection of services (i.e., "Search", "Have" lists, and "Want" lists).

A bar code scanning function 260 is added to the "Search" services of the mobile app. When the function is executed, the smartphone's integrated digital camera is activated, enabling a user to capture within a focusing target 262 an image of a bar code provided, for example, on sales tag 70 attached to an item of a merchandise 60. Once the image is captured, the underlying code is computationally extracted and then transmitted to the retailer backend network 10. The code is then matched to records within the retailer's secure product database 19 (or other product database), and records of any corresponding matches returned back to the mobile application. With the product identified as such, the user can proceed in cataloguing it, or sharing it, or tracking it, as per the invention.

Although several embodiments of the invention are disclosed hereinabove, those skilled in the art having the benefits of this disclosure can effect modifications thereto. These modifications are to be construed as being encompassed within the scope of the present invention as set forth in the appended claims.

The invention claimed is:

1. An online personal catalog and merchandise information solicitation system, through which a user can identify an item of merchandise offered for sale by a retailer and solicit information about that item, the system comprising:
   (a) a retailer backend computer network having a secure product database facility containing a record of said item of merchandise,
   (b) a retailer internet application in communication with a web computer server of the retailer backend computer network, and with authorized data access into the secure product database facility and a user interface enabling an identification by said user of said item of merchandise through said authorized data access, the retailer internet application sharing the online personal catalog with an online social network computer website and tracking items within the online personal catalog, wherein product information about the item is obtained from and personalized by the online social network computer website and the retailer backend computer network;
   (c) a web application that executes directly within or through the social network computer website that communicates with the retailer internet application so that the retailer internet application combines the personalized product information at the user interface; and
   wherein the social network computer website hosts the retailer internet application wholly or in part and associates said user to a user account on the social network computer website, the user account linking said user to a user-defined group of other users:
   wherein a programmed routine executed by a hardware server that receives callable services provided by the social network computer website, and service provider, identifies an item of merchandise and publishes the identification of said item of merchandise through the social network computer website in association with said user account in order to solicit information of the personalized product information about said merchandise including opinions, comments, ratings, and/or reviews from the online social network computer website, the hardware server thereby soliciting the information about said merchandise from the user-defined group of other users by communicating with the social network computer website, the solicited information used to provide the personalized product information to said user,
   wherein the retailer internet application further associates said user to said user account to solicit the information about said item of merchandise from the user-defined group of other users to access or otherwise make available the user's electronic social network from within the online personal catalog, in response to the programmed routine publishing the identification of the item of merchandise through the social network website in association with said user account,
   wherein the retailer internet application incorporates an application plugin that provides social network functionality therein and further provides to the user interface the solicited information about said merchandise including opinions, comments, ratings, and/or reviews from the online social network computer website via the plugin for forming the personalized product information; and
   wherein the retailer internet application in communication with the web computer server provides a first webpage that displays a tracking button hyperlinked to a second webpage that displays both item tracking information related to the item of merchandise and the solicited information from the social network computer website, the tracking information including at least one of information about availability, location, or price of the item of merchandise, and the solicited information displayed at the second webpage further including product ratings provided by the social network website in response to the programmed routine publishing the identification of the item of merchandise through the social network website,
   wherein the retailer internet application generates a search result related to the item of merchandise, and a rating of the item of merchandise generated in response to the communication between the hardware server soliciting information about said item of merchandise from the user-defined group of other users and the personalized product information via the application plugin and the web application that executes directly within or through the social network computer website.

2. The online personal catalog and merchandise information solicitation system of claim 1, wherein the retailer internet application further comprises an ecommerce portal into the retailer backend network, the ecommerce portal enabling a user to electronically purchase the item of merchandise identified by said user from said retailer.

3. The online personal catalog and merchandise information solicitation system of claim 1, wherein the retailer internet application provides at least one merchandise list file into which said user can catalogue said identified item of merchandise.

4. The online personal catalog and merchandise information solicitation system of claim 3, wherein said merchandise list file is a want list file for cataloguing identified items of merchandise wanted by the user.

5. The online personal catalog and merchandise information solicitation system of claim 4, wherein another of said merchandise list files is a have list file for cataloguing identified items of merchandise owned by the user.

6. The online personal catalog and merchandise information solicitation system of claim 1, wherein the retailer internet application is a smartphone application with bar code scanning functionality.

7. The online personal catalog and merchandise information solicitation system of claim 1, wherein the retailer internet application is capable of providing user-definable notice pertinent to said identified item of merchandise, the notice comprising at least information retrieved from the record contained in the secure product database facility pertaining to the availability of said identified item of merchandise from said retailer.

8. The online personal catalog and merchandise information solicitation system of claim 7, wherein the internet application is a smartphone application with bar code scanning functionality.

9. The online personal catalog and merchandise information solicitation system of claim 8, wherein the identification of said merchandise involves said bar code scanning functionality.

10. The online personal catalog and merchandise information solicitation system of claim 7, wherein the notice also includes information retrieved from the record contained in secure product database pertaining to a price for said identified merchandise.

11. The online personal catalog and merchandise information solicitation system of claim 7, wherein the notice also includes information retrieved from the record contained in the secure product database pertinent to other items of merchandise related to said identified merchandise.

* * * * *